United States Patent [19]
Johnson et al.

[11] Patent Number: 5,806,884
[45] Date of Patent: Sep. 15, 1998

[54] ADAPTIVE REGENERATIVE INFLATOR

[75] Inventors: Darrin L. Johnson, Fountain Hills, Ariz.; Bradley D. Harris, Farmington; Donald R. Lauritzen, Hyrum, both of Utah

[73] Assignee: Autoliv ASP, Inc., Ogden, Utah

[21] Appl. No.: 802,457

[22] Filed: Feb. 18, 1997

[51] Int. Cl.[6] ................................................. B60R 21/26
[52] U.S. Cl. ........................................... 280/736; 280/741
[58] Field of Search .................................. 230/741, 736, 230/737, 742; 222/3

[56] References Cited

U.S. PATENT DOCUMENTS

| | | | |
|---|---|---|---|
| 3,877,721 | 4/1975 | Brown, Jr. | 280/728.1 |
| 4,018,457 | 4/1977 | Marlow | 280/735 |
| 5,301,979 | 4/1994 | Allard | 280/737 |
| 5,441,302 | 8/1995 | Johnson et al. | 280/736 |
| 5,566,976 | 10/1996 | Cuevas | 280/737 |
| 5,639,117 | 6/1997 | Mandzy et al. | 280/741 |
| 5,692,776 | 12/1997 | Rink et al. | 280/741 |

*Primary Examiner*—Christopher P. Ellis

[57] ABSTRACT

A regenerative monopropellant inflator providing adaptive performance. The inflator includes a housing defining an interior. A piston is received in the housing and divides the interior into a fuel supply chamber and a combustion chamber. The piston moves through the fuel supply chamber during the regenerative combustion cycle to produce an inflation gas from reaction of the fuel in the combustion chamber. The inflation gas exits the combustion chamber via exit ports. To provide adaptive performance a back pressure may be selectively applied to the piston against its travel. This slows the piston, and thus the gas production of the inflator. Alternatively, the total size of the exit ports could be selectively varied to thus vary the pressure within the combustion chamber, known as throttling. Increased pressure within the combustion chamber causes an increase in the rate of inflation gas production. By selectively varying either the piston back pressure or throttling prior to completion of the gas generation, the performance of the inflator may be adapted to the characteristics of a particular vehicle collision.

19 Claims, 3 Drawing Sheets

ADAPTIVE REGENERATIVE INFLATOR

BACKGROUND OF THE INVENTION

1. Field of the Invention

The present invention relates in general to regenerative monopropellant inflators for airbag passive restraint systems. In particular, the present invention relates to arrangements to provide adaptive performance in regenerative monopropellant inflators.

2. Description of the Related Art

Airbag passive restraint systems have become increasingly common in passenger vehicles. Airbag systems typically include a collision sensor which provides a signal upon sensing the onset of a collision. The collision sensor is connected to an inflator which very rapidly produces a quantity of gas upon receipt of the signal. The inflator is in turn connected to a flexible fabric cushion. The cushion is inflated by the gas, and it is the compression of this inflated cushion which protects the passenger.

Various general classes of airbag inflators are known, and are grouped according to their operating principle. Two of the most common types are typically referred to as pyrotechnic and hybrid. Pyrotechnic inflators employ pellets of material (typically sodium azide) which rapidly burn to produce nitrogen gas. These inflators are small and relatively light weight, but sodium azide (in solid form) is poisonous. Hybrid inflators employ a quantity of stored, pressurized inert gas, together with a charge of pyrotechnic material (typically not sodium azide). The pyrotechnic material heats the stored gas to increase its pressure when filling the cushion. While hybrid inflators avoid the poisonous sodium azide, the pressure vessel for the pressurized gas is typically rather large, and poses the risk of rupturing. Further, there is the possibility that the stored gas will leak from the vessel, rendering the inflator useless.

The present invention is concerned with yet another type of inflator, referred to as a regenerative monopropellant inflator. Such inflators generally include a housing having an interior. Within this interior is a piston, which divides the interior of the housing into a fuel storage chamber and a combustion chamber. Within the storage chamber is a monopropellant: a fuel which will burn (or oxidize or decompose) rapidly upon ignition, creating a suitable gas. The piston (or some other part of the inflator) includes passages to permit the fuel to flow from the storage chamber to the combustion chamber. These passages are initially blocked.

The inflator further includes an initiator, which produces a small charge of heat and pressure within the combustion chamber. This pressure drives the piston back away from the combustion chamber, compressing the fuel storage chamber. This compression of the fuel causes the pressure of the fuel to rise, which unblocks the fuel flow passages. As such, a flow of fuel jets into the combustion chamber, and is ignited. This again produces more pressure, which serves to drive the piston further back. This again causes more fuel to flow into the combustion chamber to ignite, and again cause pressure. This self-sustaining combustion process is the reason these inflators are referred to as "regenerative."

Regenerative monopropellant inflators provide several advantages. They need not employ toxic fuels, are not initially pressurized, are relative small and light weight, and the gas is produced with an advantageous pressure versus time curve. There are also areas in which such inflators could be improved. One area for improvement is to provide adaptive performance. Adaptive performance is a variation in the inflator gas output to provide the best protection to the occupant based upon the specific facts of the actual collision. For example, collisions vary in their severity, occupants vary in their weight, the position of the occupant in the seat (and therefore the distance from the inflating cushion) varies, the ambient temperature can affect gas output, etc. In adaptive performance a controller measures some or all of these variables (or others) and causes the inflator to provide the gas in a manner best suited to provide protection. For example, if the occupant is seated well forward in the seat, and is therefore close to the inflating cushion, the inflator may produce gas at a lower rate, so that the cushion inflates slower and does not injure the occupant during its inflation.

SUMMARY OF THE INVENTION

An object of the present invention is to provide an airbag inflator which safely and reliably provides inflation gas.

Another object of the present invention is to provide a regenerative monopropellant inflator which has adaptive performance.

Yet another object of the present invention is to provide an adaptive regenerative inflator in which variable back pressure is applied to the piston of the inflator, to modify the combustion process, and therefore the inflation rate of the cushion.

A further object of the present invention is to provide an adaptive regenerative inflator which has variable throttled output to modify the combustion process, and therefore the inflation rate of the cushion.

These and other objects are achieved by an adaptive regenerative monopropellant inflator providing adaptive performance. The inflator includes a housing defining an interior. A piston is received in the housing and divides the interior into a fuel supply chamber and a combustion chamber. The piston moves through the fuel supply chamber during the regenerative combustion cycle to produce an inflation gas from reaction of the fuel in the combustion chamber. The inflation gas exits the combustion chamber via exit ports. To provide adaptive performance a back pressure may be selectively applied to the piston against its travel. This slows the piston, and thus the gas production of the inflator. Alternatively, the total size of the exit ports could be selectively varied to thus vary the pressure within the combustion chamber, known as throttling. Increased pressure within the combustion chamber causes an increase in the rate of inflation gas production. By selectively varying either the piston back pressure or throttling prior to completion of the gas generation, the performance of the inflator may be adapted to the characteristics of a particular vehicle collision.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
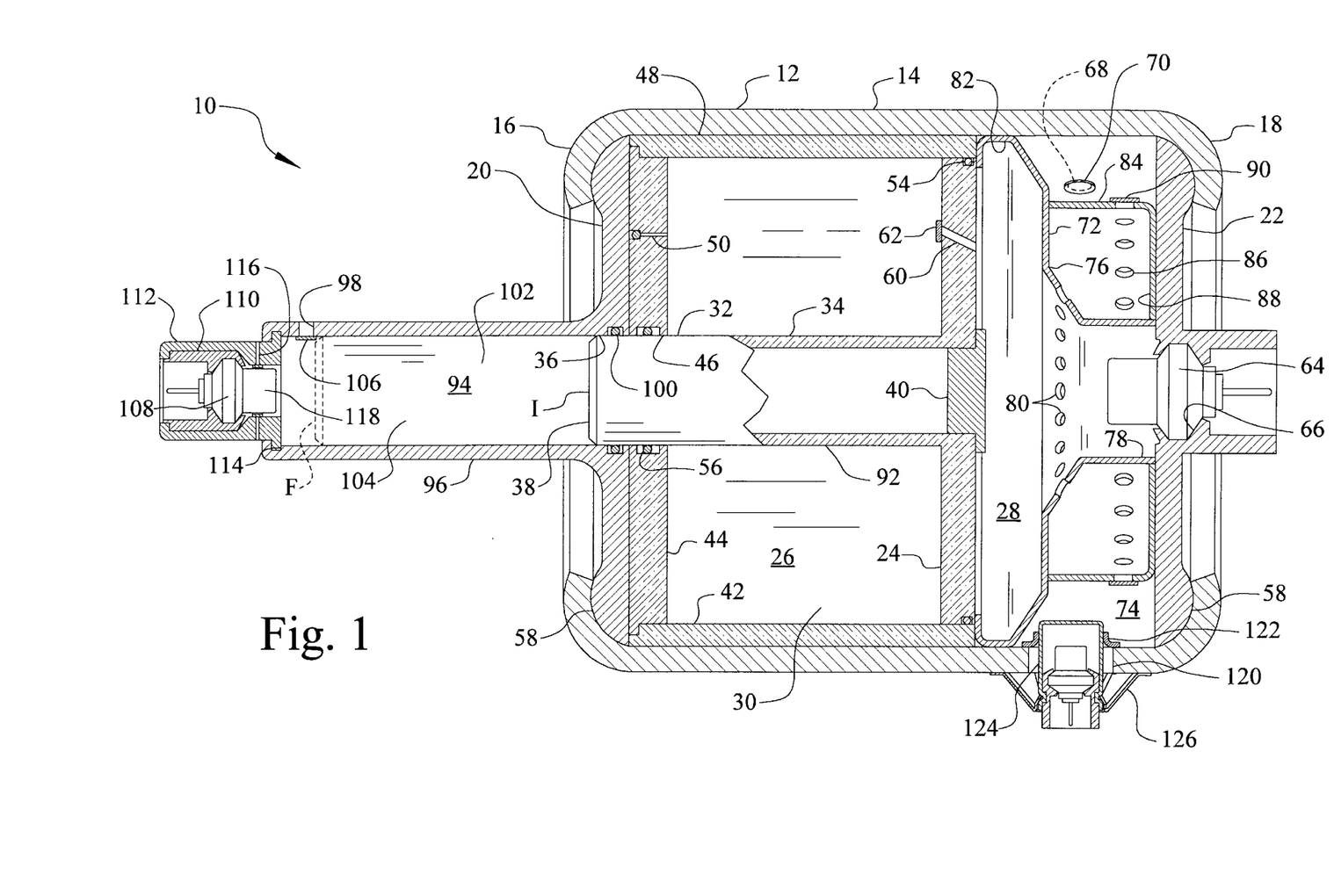
FIG. 1 is a side view in partial cross-section showing an adaptive inflator according to a first embodiment of the invention.

With reference to FIG. 1, a first embodiment of a regenerative monopropellant airbag inflator is generally designated by reference numeral 10. The inflator 10 includes a housing 12 defined by a sidewall 14 having a first end 16 and a second end 18. The sidewall will preferably take the general form of a cylindrical tube, but other cross-sectional shapes may be employed. The sidewall defines a longitudinal axis (not shown) extending between the first and second ends. The housing further includes first and second end caps 20 and 22, secured to the first and second ends, respectively. The housing is formed of a material sufficiently rugged to survive the temperatures and pressures generated, typically a metal such as steel or aluminum.

As may be seen, the sidewall and end caps of the housing serve to define an interior. Mounted within this interior is a piston 24, oriented substantially normal to the longitudinal axis of the housing. The piston serves to generally divide the interior of the housing into a fuel supply chamber 26 and a combustion chamber 28. Within the fuel supply chamber 26 there is stored a quantity of a fluid monopropellant 30. One suitable fluid monopropellant is hydroxyl ammonium nitrate (HAN), which takes the form of a liquid. The HAN is relatively safe to work with and store, since it will only combust if it is pressurized, thus reducing the possibility of unintentional activation. Further, the HAN is nontoxic, though corrosive. When placed under pressure, however, this liquid is capable of rapid combustion to form gaseous nitrogen.

The piston 24 is mounted to permit movement with respect to the housing toward the first end 16. To ensure that the piston remains substantially normal to the longitudinal axis, the piston is preferably provided with piston alignment means 32. In the embodiment of FIG. 1, the means 32 takes the form of a stem 34 fixed to the piston, and extending from the piston to, and through, a stem aperture 36 in the first end cap 20. As shown here, the stem is hollow to reduce weight, with its free end 38 being closed (such as by a monolithic wall formed during molding of the piston) to form a concavity opening upon the piston 24. This concavity could be covered with an appropriate plug 40.

As may be envisioned, the stem 34 will slide through the stem aperture 36 in the first end cap 20 as the piston moves toward the first end 16, thus retaining the proper orientation of the piston. Various other means may be used for the piston alignment means 32. For example, a plurality of slide rods could be provided, each extending through the first end cap 20. Alternatively, the piston could be provided with a peripheral skirt. Other arrangements for the piston alignment means 32 will be apparent to those skilled in the art.

To ease assembly, it is typically preferred that the piston 24 and fuel supply chamber 26 be formed as a complete unit which may be inserted into the housing 12, with portions of this unit becoming a part of the housing. For example, in the embodiment of FIG. 1 there is provided a cylindrical chamber wall 42, having longitudinal ends. An end wall 44 closes the first of these longitudinal ends, adjacent first end 16 of the housing. The piston 24 is placed within the chamber wall at the second of the chamber wall ends. The end wall 44 includes a stem opening 46 which receives the piston stem 34. The piston 24 slides within the chamber wall 42, and the stem 34 slides through the end wall 44. As may be seen, the piston, chamber wall, end wall, and stem all serve to define the fuel supply chamber 26, and will retain the monopropellant 30. When filled with the monopropellant 30, a tank subassembly 48 is formed.

This tank subassembly may be assembled at a protected location to minimize the dangers created by the monopropellant 30. The monopropellant 30 may be introduced through a fill valve 50, which is then sealed appropriately. This filling of the tank subassembly 48 will preferably create only mild pressure within the subassembly. However, to ensure that the piston is not driven from the chamber wall, the piston is blocked against movement toward the second end 18. This could be effected by a lip (not shown) extending radially inward about the periphery of the second end of the chamber wall 42, which is closest to the second end 18. An alternative arrangement is provided in this embodiment, and is discussed more fully below.

For certain types of monopropellant, such as the preferred HAN, the monopropellant is corrosive. Where a corrosive monopropellant such as HAN is used, the tank subassembly 48 (or housing 12) is formed in a manner to avoid compromise by corrosion. For example, some or all of the elements may be formed of materials unaffected by the monopropellant, such as plastic. In the embodiment of FIG. 1 the piston 24, chamber wall 42 and end wall 44 are formed of plastic components, with the walls 42 and 44 being sealed together, as by welding. Metal components could be employed, but if the monopropellant is corrosive such metal components will need to be coated, such as with Teflon®, for protection.

For each of these arrangements there is typically a need to seal the piston 24, and the piston alignment means 32, against leakage of the fluid monopropellant. The piston 24 may be sealed by the use of a standard O-ring 54 held within a peripheral groove in the piston. Similarly, an O-ring 56 may reside in a groove in the stem opening 46 to seal against the stem 34. While a similar seal could be used instead in the stem aperture 36, the possibility of the monopropellant leaking between the end wall 44 and first end cap 20 points toward the need for the seal at the end wall 44. Other sealing arrangements are of course available.

While the formation of such a tank subassembly 48 is preferred, it is not required. For example, the piston could be retained against movement toward the second end 18 by an appropriate element. This could be a tube (not shown) extending between the second end cap 22 and the piston 24, and/or a C-clip retained within a peripheral groove (not shown) on the interior face of the sidewall 14 (or exterior face of stem 34), or other known elements. Providing the first end cap 20 with a seal for the stem 34 and a fill valve would then permit the monopropellant to be introduced directly into the housing.

With either method, the first end cap 20 is fixed to the sidewall 14, the tank subassembly 48 (or piston 24) is placed in the housing, and the second end cap 22 is fixed to the sidewall 14 to thus assemble the inflator 10. Variations may of course be made in this process. For example, the housing may be formed from impact extruded aluminum (or other processed material) such that the first end cap 20 (or second end cap 22) is a monolithic extension of the sidewall 14, and thus no assembly is required between these components. Alternatively, the end cap(s) could be fixed to the sidewall 14 using inertia, laser, or other types of welding. In the preferred arrangement however, at least one, and most preferably both, of the end caps are fixed to the sidewall 14 using swaging.

Specifically, each of the end caps include a peripheral rounded section 58 facing outward of the inflator. The respective ends of the sidewall 14 may then be formed over these rounded sections by swaging to form an effective bond and seal. This swaging does, however, exert longitudinal forces upon the end caps, tending to force them longitudinally inward. To effect the swaging, it is therefore necessary to prevent this movement of the end caps. This could be achieved by forming appropriate shoulders on the interior face of the sidewall 14, and abutting the end caps against these shoulders. Alternative arrangements, are, however preferred, and are discussed more fully below.

To cause the combustion in the combustion chamber 28, the monopropellant 30 must pass from the fuel supply chamber 26 to the combustion chamber 28. This may be achieved by the use of a plurality of injection ports 60 extending through the piston 24 (the size of the ports being exaggerated in the figures, and only one being shown). The ports 60 are small conduits through which the monopropellant 30 may flow. In use, the flow though the ports will be rather fine, and somewhat similar to a shower head. As used hereafter, the term "flow" to describe the monopropellant 30 exiting from each injection port 60 will be understood to encompass a "spray" form of flow. It is also noted that the injection ports need not extend through the piston, so long as the desired flow is achieved. As such, the ports could be formed as grooves in the inner face of the chamber wall 42, permitting flow around the piston, rather than through the piston.

To prevent flow until the inflator 10 is activated, the injection ports 60 are releasably blocked. In particular, seal means 62 are provided to seal the ports against flow of monopropellant below a predetermined pressure of the monopropellant. In other words, this seal means 62 will block the flow of the monopropellant through the ports while the monopropellant is below the predetermined pressure. When the monopropellant reaches the predetermined pressure, however, the seal means 62 will fail, and the monopropellant may flow. This seal means may take various forms, such as a layer of plastic and/or foil bonded over the ports (as shown in FIG. 1), or a mass of material (not shown), such as silicone, plugging the port.

The seal means 62 thus serves to block movement of the piston 24 toward the first end 16 prior to activation. As may be envisioned, the blocked ports 60 and piston 24 together define a wall. When this wall moves toward the first end 16, the volume in the fuel supply chamber 26 is reduced. Since the amount of monopropellant 30 remains the same, the reduced volume causes the pressure of the monopropellant 30 to rise. This pressure exerts a force against the piston, opposing further movement toward the first end 16.

During activation of the inflator 10 the pressure of the monopropellant 30 exceeds the predetermined pressure, rupturing the seal means 62 and forcing the monopropellant 30 to flow through the injection ports 60. To create this increased pressure in the monopropellant 30, an increased pressure is created in the combustion chamber 28. Specifically, the inflator 10 is provided with means for creating increased pressure and heat within the combustion chamber 28, with this increased pressure and heat being sufficient to both overcome the seal means 62 and to ignite the monopropellant 30 which flows through the piston 24 into combustion chamber 28.

This means for creating pressure and heat will preferably take the form of an initiator 64 (often referred to as a squib), and possibly an associated mass of ignition material (not shown). As is known in the art, initiators receive an electrical signal (such as from a collision sensor, not shown) and in response create a brief flash of high temperature, and possibly a quantity of gas. This may be sufficient to increase the pressure within the fuel supply chamber 26 without more. However, the addition of the ignition material may be required. The ignition material may take the form of a pyrotechnic material (granular, pelletized, powdered, etc.) placed to be ignited by the initiator 64. The additional gas and heat produced by the ignition material acts in the same way to increase the pressure and temperature in the combustion chamber 28.

The means for creating pressure and heat may be located at various positions in communication with the combustion chamber 28. For example, this means could extend through the sidewall 14 in the combustion chamber 28. In the embodiment of FIG. 1, the means is located in the second end cap 22. Specifically, the second end cap 22 includes an initiator cavity 66 opening to the exterior of the inflator 10. The initiator 64 is fixed within this cavity 66, such as by crimping.

As may be envisioned, when the initiator 64 is activated, the heat and pressure will flow through the combustion chamber 28, increasing the pressure in the combustion chamber 28. This will in turn force the piston 24 in the direction of the first end 16.

As noted above, this will increase the pressure of the monopropellant 30. Further, as the forces on the piston reach equilibrium, the pressure of the monopropellant 30 will be slightly greater than that in the combustion chamber 28. This is because of the presence of the stem 34, which reduces the surface area of the piston in the side facing the fuel supply chamber 26. Thus, to create a sufficient force to oppose the pressure in the combustion chamber 28, the monopropellant 30 must be at a pressure higher than that in the combustion chamber (this higher pressure, multiplied by the smaller surface area, resulting in a force equal to that applied by the lower combustion chamber pressure, multiplied by the larger piston area). This higher pressure of the monopropellant 30 is designed to be above the predetermined pressure, and thus ruptures the seal means 62, and causes the monopropellant 30 to flow (more accurately, spray) into the combustion chamber 28.

Due to the high temperature in the combustion chamber, which is above the combustion temperature for the monopropellant 30, the monopropellant 30 injected into the combustion chamber 28 begins to combust. As in the case of HAN, the increased pressure in the chambers 26 and 28 may also be a necessary factor in the ability of the monopropellant 30 to combust. During this combustion the HAN monopropellant will form primarily nitrogen gas, along with trace amounts of water (in the form of steam). This combustion and formation of gas will further increase the temperature and pressure within the combustion chamber 28.

This increase in pressure within the combustion chamber 28 will act as before to force the piston 24 further toward the first end 16. Also as before, this will further compress the monopropellant 30, and cause it to continue to spray from the injection ports 60 into the combustion chamber 28. This further monopropellant 30 will thus combust within the combustion chamber 28, increasing the pressure (and likely temperature), and therefore continuing to drive the piston further. This again causes the monopropellant 30 to continue to spray from the injection ports 60, and so on. This continuing process of combustion pressure causing flow, and flow causing combustion pressure is self sustaining, and is the reason inflators of this type are referred to as "regenerative."

The gas produced during this regenerative combustion process is used to inflate the cushion (not shown) of the airbag system. As such, the gas must be able to flow from the combustion chamber 28 out of the inflator 10. To this end, the housing is provided with at least one exit port 68 extending therethrough to connect the combustion chamber 28 and atmosphere. While the port(s) could be formed through the second end cap 22, in the embodiment shown it is preferred that at least one exit port 68 extend through the sidewall 14, in a portion communicating with the combustion chamber 28. The port(s) 68 will permit a sufficient flow of gas to inflate the cushion within the desired time, but will restrict gas flow sufficiently (i.e., throttle) to maintain the pressure within the combustion chamber 28.

While the above description is sufficient for a basic regenerative inflator, various improvements may be desirable. For example, the preferred HAN requires high pressure before it is combustible. It may therefore be desirable, or necessary, to provide a frangible combustion seal 70 interposed between the combustion chamber 28 and the atmosphere. The combustion seal 70 may take the form of a film or foil which will rupture at a predetermined combustion pressure, which is on the order of the pressure necessary to combust the HAN. As such, during the initial stages of the regenerative process the pressure in the combustion chamber 28 will build due to the presence of the combustion seal 70, rather than have the combustion gas immediately exit the exit port 68.

A further improvement in construction may be advantageously achieved by the use of the tank subassembly 48 and a spacer (not shown) between the tank subassembly and the second end cap. In particular, a first end of the chamber wall 42 of the tank subassembly 48 will abut against the first end cap 20 (possibly via the end wall 44, as shown), and the spacer would extend between a second end (closest to second end 18) of the chamber wall 42 and second end cap 22. The longitudinal ends of such a spacer would therefore abut against both the chamber wall 42 and the second end cap 22. The chamber wall 42 and spacer (possibly together with the end wall 44) would therefore form a rigid span between the end caps, serving to hold the end caps against longitudinal movement to permit the desired swaging of the ends 16 and 18.

Since the spacer would extend between the chamber wall 42 (and more particularly the piston 24) and the second end cap 22, it would pass through the combustion chamber 28. The spacer is therefore preferably formed to avoid interference with the combustion process. In its simplest form, the spacer could have a generally tubular form closely corresponding to the interior of the sidewall 14.

While such a spacer would be an improvement, it is preferred to provide an arrangement to force a more tortuous path for the combusting monopropellant. In particular, the monopropellant (at least the preferred HAN) requires an elevated pressure to combust. Therefore, any droplets of the monopropellant which are entrained in the generated gas will cease combustion upon exiting the inflator and entering the reduced pressure of the atmosphere. It is therefore desirable to increase the amount of time the gas remains in the inflator (known as residence time) sufficiently to ensure that all droplets of the monopropellant combust. This will increase the efficiency of the inflator, as none of the monopropellant will be wasted.

To increase residence time, this embodiment includes a blocking wall 72 extending across the interior of the housing 12, at a position intermediate the piston 24 and exit ports 68. The blocking wall 72 will serve to define a flow volume 74 between the blocking wall 72 and second end cap 22. If the initiator 64 is mounted within second end cap 22, the blocking wall 72 includes an initiator opening 76 positioned over the initiator 64, and a barrier tube 78 extending between the blocking wall 72 and second end cap 22, in surrounding relation to the initiator 64. In this way the initiator 64 may still communicate with the combustion chamber 28. The barrier tube 78 (or blocking wall 72) will then include a plurality of entrance holes 80 extending therethrough. In the embodiment shown, the barrier tube 78 includes a tapered section, and the entrance holes 80 are located within this tapered section. To increase the pressure within combustion chamber 28 it may be desirable to provide a rupturable film or foil (not shown for clarity) over these entrance holes 80.

As may be envisioned, the gas and combusting monopropellant 30 will be forced to flow through the entrance holes 80, and then change direction to reach the exit ports 68. This will serve to slow the gas and thus ensure complete combustion of the droplets of monopropellant 30. Additionally, the outer periphery of the blocking wall 72 may advantageously be extended with a spacer 82 to abut the piston 24 and form a span to secure the tank subassembly 48 and second end cap 22, as noted above. Most advantageously, the entire spacer 82, blocking wall 72, barrier tube 78 combination may be formed from a single piece of stamped metal, reducing fabrication cost and providing for simple assembly.

While this arrangement increases combustion of the droplets, further steps are preferred to increase combustion yet further. Specifically, a tubular diverter wall 84 may be placed within the flow volume 74 coaxially surrounding the barrier tube 78. This diverter wall 84 will include a plurality of exit holes 86. To maintain the diverter wall in position, an annular placement plate 88 may have its outer diameter secure to the diverter wall, and its inner diameter secured to the barrier tube 78. In the embodiment shown, the diverter wall 84 and placement plate 88 are formed monolithically as a cup shape, and the inner diameter of the placement plate 88 abuts against the barrier tube 78. The exit holes may also be initially blocked by a rupturable film or foil 90, as shown, to initially block flow of the gas and increase pressure in the combustion chamber 28, as described above.

As may be envisioned, the gas flow must change direction to flow outward through the exit holes 86. Further, the exit holes 86 may be placed offset from the exit ports 68, as shown, so that further direction changes are required for the gas to flow from the exit holes 86 to the exit ports 68. These direction changes serve to reduce the velocity of the gas, increasing combustion, and thus efficiency of the inflator. Additionally, the presence of the diverter wall 84 serves to reinforce the blocking wall 72 against the pressures created in the combustion chamber 28, and may permit a thinner material to be used for the blocking wall 72.

The above-described arrangement provides a desirable regenerative monopropellant inflator. However, such an inflator is limited to a single output performance. Specifically, the inflator 10 as described will produce a certain quantity of inflation gas within a certain amount of time. While this is serviceable, as noted above it is desirable to provide adaptive performance to permit the inflator to better protect the occupant. To this end there are further modifications possible to the inflator, which are the subject of the present invention.

A first modification to permit adaptive performance is the provision of selectively variable piston back pressure.

With reference to FIG. 1, the piston 24 is provided with a plunger section 92 connected to the piston to travel therewith. In this embodiment, the stem 34 acts as the plunger section 92. The inflator 10 is also provided with a plunger volume 94 through which the plunger section 92 travels during movement of the piston. In this embodiment the first end cap 20 includes a plunger tube 96 extending outward from the stem aperture 36, in the direction of movement of the piston 24. The interior of the plunger tube 96 defines the plunger volume 94. The plunger volume has a sufficient length to permit the plunger to move with the piston through its entire length of travel without obstruction. The plunger volume 94 may include at least one plunger vent 98 providing communication with atmosphere.

Various other arrangements for the plunger section and plunger volume are of course possible. For example, rather than a single stem 34, multiple stems could be provided, each defining a plunger section and each having a mating plunger volume. Alternatively, the piston could include a peripheral skirt extending toward the first end 16, and the housing include an annular space which receives the skirt during piston travel. Such an annular space would then form the plunger volume. Various other examples are also available. These examples are not limited to placement within the periphery of the piston, or between the piston and first end cap 20, but could be radially exterior of the piston, and/or extend between the piston and second end cap 22.

The plunger section 92 will fit closely within the plunger volume 94, such that there is at least a partial seal. In the present embodiment, the plunger section 92 and plunger volume 94 both have a circular cross-section of substantially equal diameters, to provide a close sliding fit. Additionally, a true seal, such as an O-ring 100 may be placed in an appropriate groove in the stem aperture 36 for greater sealing. As such, the movement of the plunger section 92 through the plunger volume 94 will reduce the volume within the plunger volume 94 which is not occupied by the plunger section, with this unoccupied volume being referred to as a free plunger volume 102. This is illustrated in FIG. 1, where the initial position of the end 38, prior to travel of the piston, is shown in solid line and marked by letter I, and the final position of the end 38 is shown in dashed line and marked by letter F. The free plunger volume 102 will thus decrease with movement of the plunger section 92 toward the first end 16.

Received within the plunger volume 94 is a quantity of plunger fluid 104. The plunger fluid 104 may be liquid or gas, compressible or incompressible. For example, a fluid such as water could be employed, or a gas such as air or argon. To ensure that the plunger fluid 104 remains within the plunger volume 94, any plunger vents 98 may be initially sealed with a rupturable film or foil 106. If air is employed, however, this foil 106 may be omitted if desired. The plunger fluid 104 will typically occupy the entirety of the free plunger volume 102.

As may be envisioned, when the piston 24 begins to move toward the first end 16, the plunger section 92 will also move, reducing the size of the free plunger volume 102. This will compress the plunger fluid 104, increasing its pressure. This increased pressure in the plunger volume 94 will create a force against the movement of the plunger section 92, and thus the piston 24. As such, the pressure in the plunger fluid 104 is a back pressure against the piston 24. The force created by this back pressure attempts to move the piston 24 away from the first end 16. As such, the back pressure acts against the pressure in the combustion chamber.

As noted above, it is the movement of the piston toward the first end 16 which compresses the monopropellant 30, and increases its pressure. Since the back pressure acts against movement of the piston toward the first end 16, it causes a reduction the pressure of the monopropellant 30. This will in turn reduce the flow rate of the monopropellant 30 into the combustion chamber, and thus will slow the rate of combustion for the entire inflator. The greater the pressure in the plunger volume 94, the slower the combustion rate is for the inflator.

This is the basic operating principle of this modification. The plunger and plunger volume could of course be designed to provide a desired back pressure to provide a desired performance. However, the desired result is not simply a single predetermined performance level, but adaptive performance. To provide a variation in available performance, the pressure within the plunger volume 94 must be variable at the time of operation of the inflator.

This variation in the pressure within the plunger volume 94 can be achieved in two different ways according to the present invention: (1) by either selectively increasing the pressure of a captive, constant, quantity of plunger fluid 104, or (2) by selectively restricting the flow of the plunger fluid 104 out of the plunger volume 94 to reduce the quantity of plunger fluid.

The first option entails the use of a captive quantity of plunger fluid 104, and as such, the plunger vent 98 can be completely omitted so that the plunger volume 94 is completely closed. This is the extreme case of a complete restriction on the plunger fluid 104. For this case, the plunger section 92 will move with the piston, and reduce the free plunger volume 102 while continually compressing the plunger fluid 104. As such, the pressure within the plunger volume 94 will start at an initial pressure $P_i$ prior to movement of the plunger section, and increase to a higher, final pressure $P_f$ once the plunger has reached its final position F. Depending upon the fluid used for the plunger fluid 104, the free plunger volume 102 may need to be relatively large even after the plunger section 92 has reached its final position F, so that the final pressure $P_f$ of the plunger fluid 104 is still sufficiently low to permit movement of the piston. This can be achieved by simply forming or mounting an enlarged cavity (not shown) at the free end of the plunger tube 96.

The increase in pressure of the plunger fluid 104 during movement of the plunger section will, depending upon the amount of increase, act to slow the piston 24 and thus affect performance. However, this pressure variation is not adaptive performance. Rather, for adaptive performance the pressure change meant here is a selective change in the initial pressure $P_i$ at the time of the collision. By changing this value of $P_i$, the pressure of the plunger fluid 104 is increased throughout movement of the plunger section 92, up to and including $P_f$. This increased pressure will tend to slow the piston, compared to a lower pressure $P_i$. This selective change in initial pressure $P_i$ will provide the desired adaptive performance.

This change in $P_i$ may be achieved by providing the plunger volume 94 with at least one plunger generator 108 in communication with the plunger fluid 104. The plunger generator 108 will produce gas and/or heat upon activation. While various suitable devices may be employed for the plunger generator, a squib or initiator similar to those described previously may be used, especially when the plunger fluid 104 is a gas. The gas generator may additionally include a quantity of ignition material (not shown) as described above for increased effect.

The plunger generator 108 may be mounted to the plunger tube 96 at a position within the travel of the plunger section 92 so long as the mounting does not interfere with the motion of the plunger section 92. However, it is preferred that the plunger generator 108 be mounted at a position outside of the plunger section travel, such as at the free end of the plunger tube 96, as shown. The plunger generator 108 may be mounted in an appropriate holder 110, such as by crimping. This holder may in turn be secured within a generally tubular end plug 112 which is in turn mounted to the plunger tube 96. In the embodiment shown, the end plug 112 includes a reduced inner diameter against which the inner end of the holder 110 abuts, and the outer, free, end of the end plug 112 is crimped or swaged over the outer end of the holder 110. The inner end of the end plug 112 includes an outward facing shoulder which abuts against an inward facing shoulder 114 formed on the inner face of the outer, free end of the plunger tube 96. The portion of the plunger tube 96 projecting beyond the shoulder 114 is then crimped or swaged over the shoulder of the end plug 112.

As may be envisioned, activation of the plunger generator 108 by the controller (not shown) will cause heat and/or gas to be generated. Any heat generated will serve to raise the temperature of the plunger fluid 104, thus increasing its pressure, as desired. Any gas generated will add to the plunger fluid 104 confined within the plunger volume 94, thus increasing the pressure of the plunger fluid 104. As such, with either or both mechanism the initial pressure $P_i$ of the plunger fluid 104 is selectively raised by the controller.

Figures 2, 5, 6, 7:
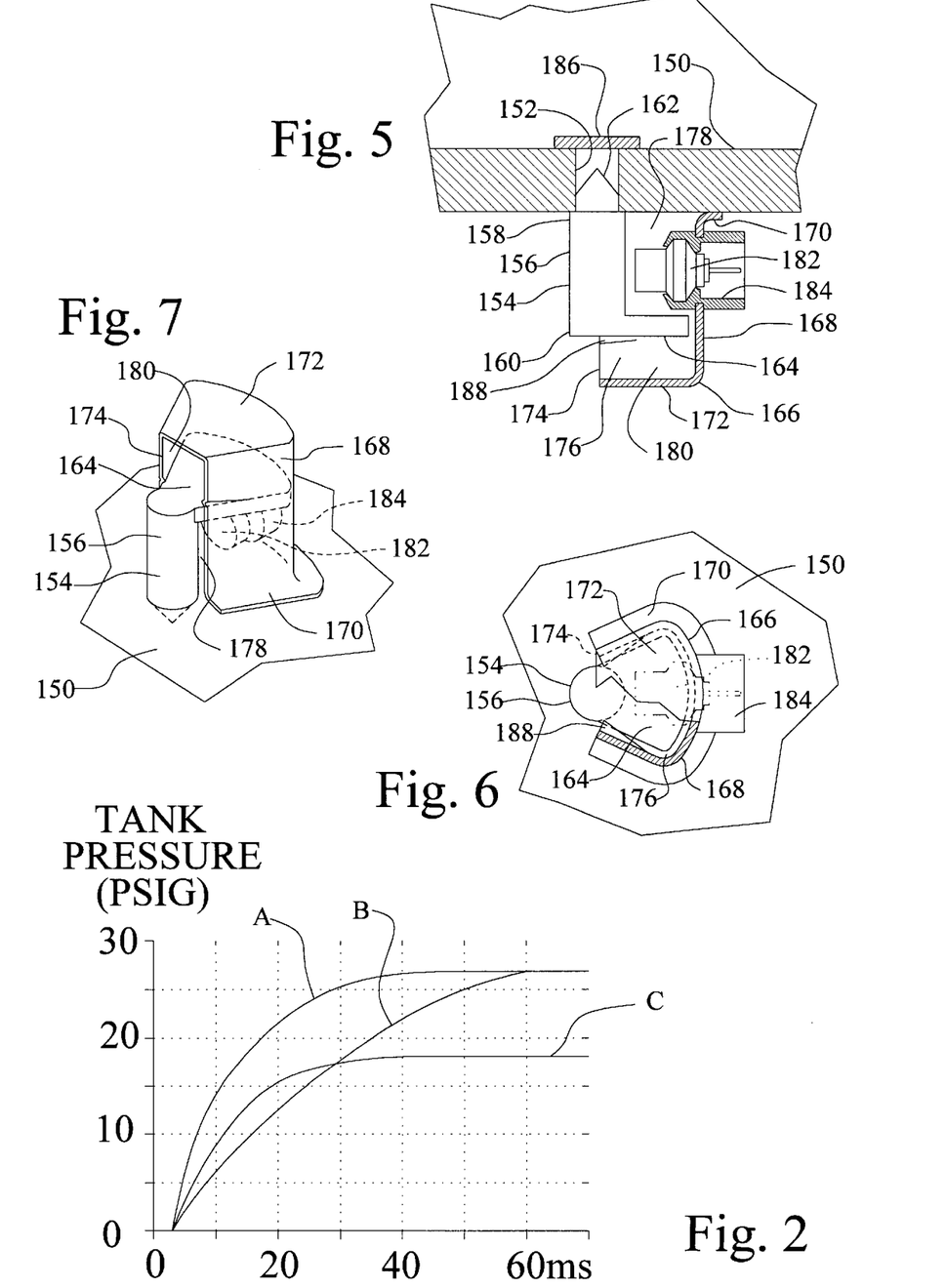
FIG. 2 is a graph illustrating performance variation for the inflator of FIG. 1.
FIG. 5 is a detail side view in partial cross-section showing a back pressure/throttling arrangement according to a second embodiment of the present invention.
FIG. 6 is a top view in partial cross-section of the arrangement of FIG. 5.
FIG. 7 is an isometric view of the arrangement of FIG. 5.

The effect of this pressure increase upon the cushion inflation is illustrated in FIG. 2, which graphs the pressure generated by the inflator 10 within a closed test tank over time. Since this is the pressure generated by the outflowing gas, it is analogous to the pressure generated over time within the inflating cushion. In this figure, line A indicates the pressure generated by the inflator when the plunger generator 108 is not activated. For this case the pressure of the plunger fluid 104 will rise with plunger movement to slow the piston to some extent, with this extent being predetermined by the type and amount of plunger fluid 104, the volume of plunger volume 94, etc. As an example, however, for this case the maximum pressure is attained in approximately 40 milliseconds.

Line B in FIG. 2 illustrates the pressure generated when the plunger generator 108 is activated by the controller. Here, the additional pressure in the plunger fluid 104 exerts a greater force on the plunger section 92 to slow the piston to a greater extent. This slows the performance of the inflator, such that the maximum pressure is attained in approximately 60 milliseconds. As such, it may be seen that increasing the piston back pressure will slow the performance of the inflator. The controller could thus be programmed to activate the plunger generator 108 to slow performance for "soft" inflation situations such as a low-speed collision, a light weight occupant, an occupant positioned close to the cushion, etc., but not activate the plunger generator 108 to speed performance for "hard" inflation situations.

Variations are of course possible to provide greater performance variation. For example, providing more than one plunger generator 108 would provide additional pressure levels for the plunger fluid 104, and thus provide greater variation in the speed of performance. Additionally, the above discussion assumes that the plunger generator 108 is activated prior to movement of the piston 24 and plunger section 92 (i.e., prior to activation of the initiator 64). As an alternative, the plunger generator 108 could be activated by the controller simultaneously with, or after, activation of the initiator 64, but prior to the plunger volume 94 reaching its final position F. While not actually increasing the initial pressure $P_i$ (since it is some intermediate pressure which is increased), the pressure is increased prior to the final pressure, and is intended to be included in the phrase "increase in initial pressure". This delayed activation of the plunger generator 108 would provide an initial period of fast inflation, before activation, followed by a period of slow inflation after activation. The time of activation could of course be varied to achieve full inflation at any desired time.

With each of the above examples the rate of inflation has varied, but the same amount of gas has been produced (thus reaching the same pressure for lines A and B in FIG. 2). It is possible to use the plunger generator 108 to vary the amount of gas produced, and thus the final pressure of the cushion. Specifically, as noted above the additional pressure created by the plunger generator 108 acts against motion of the piston. If the amount of this pressure is sufficiently great, it can completely stop the motion of the piston 24 (or possibly slow it sufficiently to interrupt and halt the regenerative cycle).

Figure 3:
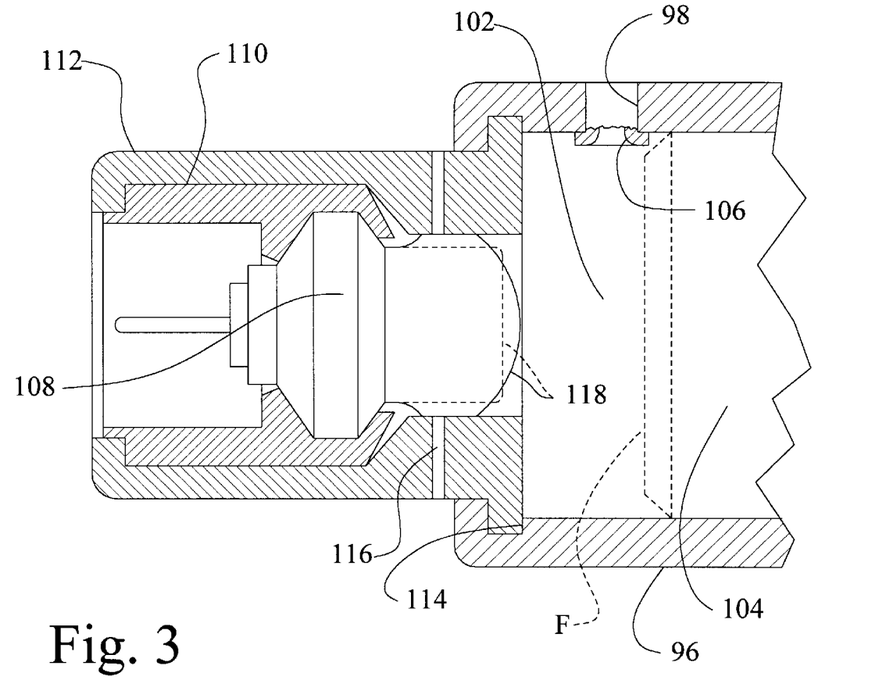
FIG. 3 is a detail view in partial cross-section of the back pressure arrangement of FIG. 1.

This is illustrated by line C in FIG. 3. With this arrangement the controller does not initially activate the plunger generator 108. However, before the plunger section 92 reaches its final position F, the controller activates the plunger generator 108, which is of sufficient size or power to halt the regenerative cycle. Since gas production stops earlier than without activation, the amount of gas produced, and the final pressure in the cushion, are lower than without activation. This lower cushion pressure would correspond to a "soft" inflation, while full cushion pressure would correspond to a "hard" inflation.

Even with this arrangement there are variations. Specifically, the pressure produced by the plunger generator 108 may be sufficiently large to instantly halt the piston at any time in its travel. This would result in an abrupt and immediate halt in gas production. Alternatively, the pressure produced by the plunger generator may be only so great that it ensures the piston halts before it normally would without activation (such that the final position F of the plunger section will be closer to the first end 16). This would result in the inflator continuing to produce gas for some amount of time after activation of the plunger generator 108, with the pressure tapering off more gradually, similar to that shown in line C. With this second arrangement the time of activation may again be varied to change performance. Specifically, if the plunger generator is activated, the final pressure will be lower. However, delaying the activation of the plunger generator will allow even this lower pressure to be reached sooner (in a manner similar to that illustrated by lines A and B in FIG. 2)

It is noted that each of the above descriptions for producing a lower pressure suffer from common drawbacks. Specifically, in each case the piston is halted (or slowed sufficiently to end the regenerative cycle) before the monopropellant 30 is completely combusted. However, the seal means 62 to retain the monopropellant 30 has been ruptured at that time. As such, the monopropellant 30 remaining in the fuel supply chamber 26 is free to leak out into the combustion chamber 28, and possibly out of chamber 28 into the vehicle. In the case of corrosive monopropellants such as HAN, this is undesirable, and may preclude the use of back pressure to halt the regenerative cycle.

A further drawback is more esthetic. Specifically, the regenerative cycle will be interrupted while new droplets of the monopropellant are just beginning to combust. This will likely result in these droplets combusting incompletely. This incomplete combustion, depending upon the formulation of the monopropellant, can lead to the production of nitrogen-oxygen compounds, which may have an unpleasant odor. While this would typically present no danger to the occupant of the vehicle, it is preferably avoided.

With the first option of varying initial pressure in a captive volume having been described, the second option of selectively restricting the flow of the plunger fluid 104 out of the plunger volume 94 will now be described.

In this option the plunger fluid 104 is not held captive within the plunger volume 94, but is permitted to flow out of the plunger volume 94 as the plunger section 92 moves toward the first end 16. The rate at which the plunger fluid 104 exits the plunger volume 94 will determine the pressure within the plunger volume 94. Specifically, it may be seen that if the plunger fluid 104 may exit freely without restriction, the pressure in the plunger volume 94 will be the same as in the atmosphere, and the piston will move as if the plunger, plunger volume and plunger fluid were not present. However, if the plunger fluid 104 is partially restricted, such as by having to flow through a small hole, a pressure greater than atmospheric will be created in the plunger volume 94.

As noted above, the plunger tube 96 may include one or more vents, and these vents serve as the restricted openings through which the plunger fluid 104 will vent. The particular size of the vent(s) will vary depending upon the composition of the plunger fluid 104, the back pressure desired, etc. In general, it may be seen that the smaller the size of the vent(s), the greater the restriction, and thus the greater the piston back pressure. The vent(s) may therefore be sized to provide a particular performance level for the inflator. However, this ability to provide a desired performance is not adaptive performance.

Rather, for adaptive performance, the back pressure must be variable at the time of the collision. As such, in this arrangement the size of the vent(s) is varied at the time of the collision.

In the first described arrangement, the size of the vent(s) is selectively made smaller, to thus increase the restriction and the piston back pressure. With reference to FIG. 1, the plunger tube 96 includes the plunger vent 98, initially sealed by the foil 106. However, the end plug 112, housing the plunger generator 108 also includes one or more plug vents 116, which may be initially sealed with a film or foil. The vents 98 and 116 together define the vents for the plunger volume 94.

Further, the plunger generator 108 includes an expansion cap 118 as an integral portion thereof. The expansion cap will be formed of a sufficiently ductile material, and the plunger generator 108 will have a sufficiently small combustion charge, that upon activation of the plunger generator 108 the expansion cap 118 will enlarge due to the internal pressure from the combustion.

FIG. 3 provides a detail view of this arrangement, with the expansion cap 118 prior to activation shown in dashed line, and after activation shown in solid line. As may be seen, the expansion cap 118 is initially spaced from the inner face of the end plug 112, creating an annular opening about the cap.

Further, the inner ends of the plug vents 116 are located to communicate with this annular opening. Prior to activation of the plunger generator 108 the plug vents 116 are therefore free to communicate with the free plunger volume 102 (assuming any covering foil has been ruptured). However, after activation of the plunger generator 108 the expansion cap 118 has expanded to block the entrances to the plug vents 116. While the plunger vent(s) 98 remain open (again assuming rupture of any covering foil), the size of the vents for the plunger volume 94 have been selectively decreased, thus imposing a greater restriction upon the exiting plunger fluid 104.

In operation, it may be seen that if the controller does not activate the plunger generator 108, the plug vents 116 remain open, permitting the plunger fluid 104 to exit therefrom, and from the plunger vent 98. This results in a small amount of piston back pressure, causing the inflator to reach its final pressure in a small amount of time, as illustrated by line A in FIG. 2. However, if the controller activates the plunger generator 108, the plug vents 116 are blocked, and the plunger fluid 104 may vent only through the plunger vent 98. This increases the piston back pressure, slowing performance, such that the final pressure of the inflator is reached at a later time, as illustrated by line B of FIG. 2. As such, the controller would activate the plunger generator 108 for a more "soft" inflation, but would not activate the plunger generator 108 for a "hard" inflation.

The method of operating the inflator may of course be varied. For example, activating the plunger generator 108 at the same time as the initiator 64 would result in the greatest amount of back pressure, and therefore the slowest performance. However, the plunger generator 108 may be activated after the initiator 64, providing an initial period of faster inflation and a later period of slower inflation. The delay time between activations can therefore be used to create numerous performance levels.

Further, the above discussion has assumed that the plunger vent 98 is provided. This is not required, however. Specifically, the plug vents 116 could be the only vents. In this variation, not activating the plunger generator 108 would result in the same fast gas production as noted above. Activating the plunger generator 108, however, would create a captive volume of plunger fluid 104 which would increase in pressure with movement of the plunger section 92, as described above for the first option, to slow performance. Again, the time of activation of the plunger generator 108 could be used to vary performance over the entire possible range. Further, the plunger volume 94 could be sized such that the pressure of the captive plunger fluid 104 would grow sufficiently large to halt the regenerative cycle prematurely, creating a smaller gas output, as illustrated by line C of FIG. 3.

With the above arrangements it may be seen that the back pressure upon the piston may be selectively varied. Further this selective variation in back pressure permits selective variation in the performance of the inflator. As such, the above arrangements permit adaptive performance in a regenerative monopropellant inflator.

A second modification to permit adaptive performance of the inflator is the provision of selective throttling of the gas output from the combustion chamber.

As noted above, the combustion of the monopropellant 30 within the combustion chamber 28 creates increased pressure which drives the piston 24 toward the first end 16 to sustain the regenerative cycle. Further, the gas produced by this combustion was noted as flowing from the combustion chamber 28 out of the inflator via the exit ports 68. The throttling in this modification selectively varies the pressure within the combustion chamber 28 to change the performance of the inflator.

Specifically, it may be envisioned that if the gas produced in the combustion chamber could flow out of the inflator without any restriction, the pressure in the combustion chamber 28 would be very low (approximately atmospheric). This very low pressure would not be sufficient to drive the piston 24 to cause more of the monopropellant 30 to flow into the combustion chamber. As such, the regenerative cycle would not operate.

In practice, the number and size of the exit ports 68 is chosen to restrict the flow of the gas from the combustion chamber 28. This restriction of the outflowing gas is commonly referred to as throttling. This throttling of the gas flow increases the pressure in the combustion chamber 28, in a manner similar to that described above for the plunger volume 94 and plunger vent 98. As such, the combined area of the exit ports 68 is predetermined to provide the necessary pressure to maintain the regenerative cycle.

However, as noted above, predetermined performance of the inflator is not the desired adaptive performance. To create adaptive performance, the present invention selectively varies the throttling of the combustion chamber 28. This variation in throttling changes the restriction on the exiting gas, and this varies the pressure within the combustion chamber 28. This change in combustion chamber pressure in turn varies the rate at which the piston 24 moves, and thus the rate at which the monopropellant 30 is injected into the combustion chamber 28.

This leads to a somewhat counter-intuitive result. Specifically, reducing the size of the exit ports 68 increases the rate at which the gas is produced. This is because the reduced size of the ports increases the combustion pressure and thus monopropellant injection rate. The mass flow rate of the gas exiting the inflator is thus increased, even though the size of the exit ports is decreased.

Figure 4:
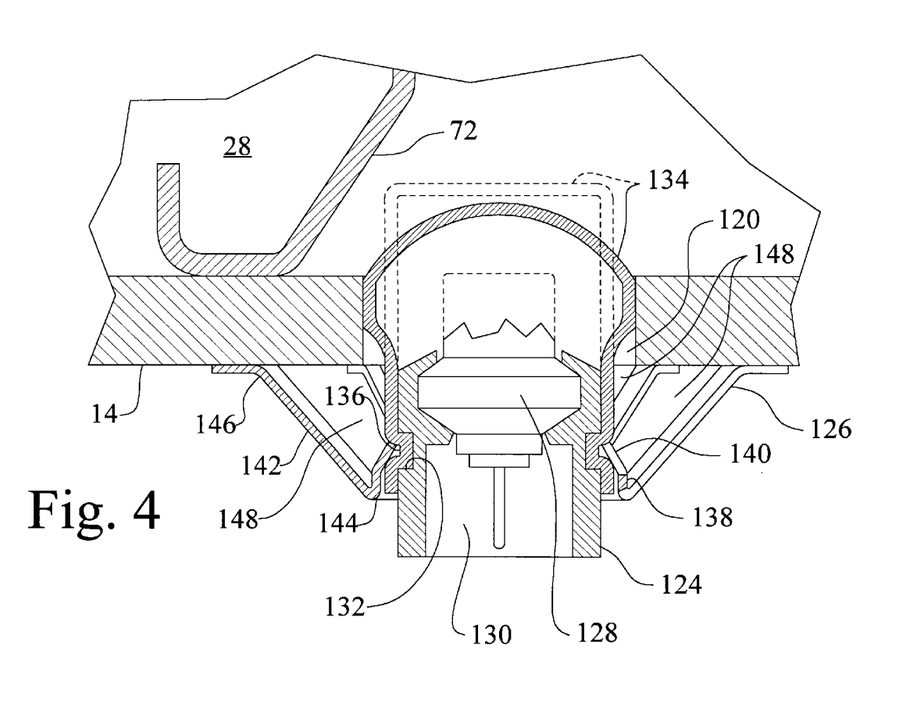
FIG. 4 is a detail view in partial cross-section of the throttling arrangement of FIG. 1.

A first arrangement to effect this is shown in FIGS. 1 and 4. With reference to FIG. 1, it is seen that the inflator includes one or more of the exit ports 68. Additionally, inflator 10 includes one or more throttling ports 120. As with the exit port 68, the throttling port 120 communicates with the combustion chamber 28 (in this case via the entrance holes 80 and exit holes 86) to permit the produced gas to exit from the combustion chamber 28 via the throttling port 120. Additionally, to prevent ingress of contaminants and/or to permit a desired initial pressure to build, the throttling port 120 may include a rupturable film or foil 122.

Received within the throttling port 120 is an expansion plug 124, which is mounted in position by a plug support 126. As is best shown in FIG. 4, in its initial form (shown in dashed line in FIG. 4) the expansion plug 124 is spaced from the inner face of the throttling port 120 so as not to fully obstruct the throttling port 120, and the plug support 126 includes one or more openings permitting communication between the combustion chamber 28 and the exterior of the inflator.

In particular, the expansion plug 124 can include a plug initiator 128, which may be a pyrotechnic initiator of the type described above, although possibly having a smaller charge. The plug initiator 128 may be mounted in a support 130 having a generally tubular form and crimped at a first end to retain the plug initiator 128. The second end of the tubular support 130 permits the plug initiator 128 to receive an appropriate connector (not shown) for connecting the plug initiator 128 to the controller (not shown). The support 130 may include a peripheral groove 132 located between its longitudinal ends, the purpose of which will be apparent from the discussion below.

The expansion plug 124 may further include an expansion cap 134 having the general form of a cup in its initial form, which is illustrated in dashed line in FIG. 4. The free or open end of the expansion cap 134 may extend over the support 130, with a close fit, such that the plug initiator 128 is received within the concavity of the expansion cap 134. To secure the expansion cap 134 in position, it may be crimped at position overlying the peripheral groove 132, as shown in FIG. 4. This crimping will result in a cup groove 136 on the exterior of the expansion plug 124.

The plug support 126 may employ this cup groove 136 to assist in the mounting of the expansion plug 124. Specifically, the plug support 126 may include a ring segment 138 having an inner diameter slightly larger than the outer diameter of the expansion cap 134. An edge of the ring segment 138 closest to the inflator may include a plurality of resilient fingers 140 angled inward, so as to engage against the inner edge of the cup groove 136. With this arrangement, the expansion plug 124 may be forced through the interior of the ring segment 138 until the fingers 140 engage with the cup groove 136, and thus secure the expansion plug 124 to the plug support 126.

The plug support 126 may further include a plurality of mounting legs 142. Each of the legs will have a first end 144 secured to the ring segment 138 and a second end 146 extending inward toward the inflator. As may be seen, a plurality of void areas 148 are defined between the mounting legs 142, permitting gas to flow through the plug support 126, as desired. The second ends 146 of the mounting legs 142 are positioned on the sidewall 14 such that the expansion plug 124 extends into the throttling port 120, and the mounting legs are secured in position, such as by welding, to the sidewall 14.

As may be seen, the expansion plug 124 is thus retained in position within the throttling port 120 in a manner permitting ease of assembly. It is also noted that the inner diameter of the throttling port 120 is larger than that of the initial outer diameter (again, shown in dashed line in FIG. 4.) of the expansion cap 134. As such, gas is initially free to flow through the throttling port 120 about the expansion cap 134, and, as noted above, is free to flow though the void areas 148 in the plug support 126. In the initial form, therefore, the initiator may function as though the expansion plug 124 were not present.

However, upon receipt of an appropriate signal from the controller (not shown), the plug initiator 128 will activate or fire. The increased pressure within the expansion cap 134 will deform the expansion cap 134, as illustrated by solid line in FIG. 4. This deformation will be designed to cause the expansion cap 134 to completely (or substantially completely) block gas flow through the throttling port 120. As such, the total area of the exit ports is reduced, increasing the throttling of the inflator, and thus increasing the rate of gas production.

In this way the expansion plug 124 permits adaptive performance of the inflator 10. As may be envisioned, for "soft" inflation the controller will not activate the expansion plug 124, providing the maximum area for the exit ports, and thus the lowest rate of gas production similar to line B of FIG. 2. However, for a "harder" inflation, the controller will activate the expansion plug 124, increasing the rate of gas production as noted above, in a manner illustrated by line A of FIG. 2. This arrangement is not limited to a single expansion plug 124 and a single throttling port 120, but may be duplicated on a plurality of the exit ports, providing multiple levels of throttling for more precise performance variation. It is noted, however, that blocking all of the exit ports is not believed to be desirable, as the pressure within the combustion chamber 28 may grow sufficiently large as to rupture the sidewall 14 in a catastrophic manner.

In the described embodiment, a separate plug initiator and expansion cap are employed. However, these items may be combined as an integral unit, similar to the plunger generator 108 described above with regard to piston back pressure. Similarly, the plunger generator 108 could be replaced with a separate initiator and expansion cap as described for the throttling.

In each of the described embodiments, the piston back pressure and the throttling have been accomplished by the blocking of a port or opening with an expanding element. Various other arrangements are, however, available for blocking a port or opening. Furthermore, the desired adaptive performance could in each case also be accomplished by the selective opening of a previously closed port. An arrangement for selective opening of a port is shown in FIGS. 5–7. The arrangement shown in these figures has equal applicability in either piston back pressure or throttling, and as such the elements common to both are identified with a common reference numeral.

Specifically, a wall element 150 is shown, which may correspond to any one of the inflator sidewall 14, plunger tube 96, or end plug 112, as previously described. In this arrangement, as will become apparent, the end plug 112 is again not required, and may be omitted if desired, with the plunger tube 96 simply ending in a closed end (not shown). Extending through the wall element 150 is a wall port 152, which may correspond to the plunger vent 98, plug vent 116 or throttling port 120, respectively, each as described previously. It is at this point that the description varies from the previous embodiments.

Mounted to the exterior of the wall element 150 (and thus to any one of the sidewall 14, plunger tube 96, or end plug 112) is a slide plug 154, which includes a main body 156 extending generally radially outward from the wall element 150 and having an inner end 158 adjacent the wall element 150, and an outer end 160. The inner end 158 includes a plug head 162 which may be received within the wall port 152 (and thus within the plunger vent 98, plug vents 116 or throttling port 120). The plug head 162 is preferably tapered to a point, for reasons described more fully below. The slide plug 154 also includes a guide flange 164 extending outward from the main body 156. The guide flange will typically extend from only a limited portion of the periphery of the main body 156.

The guide flange 164 is received within a slide cup 166. The slide cup 166 is formed of a rugged material, typically metal. The slide cup 166 includes a partial side wall 168 extending radially outward from the wall element 150 and having first and second ends. The first end is closest to the wall element 150, and includes a mounting flange 170 extending therefrom. This mounting flange 170 may be secured to the wall element 150, such as by welding, to thus secure the slide cup 166. The slide cup 166 also includes a top wall 172 closing the second end of the partial side wall 168.

The partial side wall 168 has cross-sectional configuration which conforms to that of the guide flange 164, as best illustrated in FIG. 6, to form a close sliding fit (the distance between these elements being exaggerated in the figures for clarity). As is best shown in FIG. 6, the guide flange 164 will preferably taper outward along its radial length, or include a shape which forms a shoulder directed radially toward the main body 156. While the partial side wall 168 conforms to the guide flange 164, it does not completely enclose the slide plug 154. As may be seen, the cross-sectional configuration of the partial side wall 168 is an open, rather than closed, polygon. As such, the partial side wall 168 defines a mouth 174 providing access to a cup interior 176 formed within the confines of the partial side wall 168 and top wall 172. This mouth will preferably be in close proximity to the main body 156, as shown, and the guide flange 164 will extend through the mouth 174 to be received within the cup interior 176.

It is further noted that the length of the partial side wall 168 is greater than that of the main body 156. As such, the guide flange 164 serves to divide the cup interior 176 into a lower portion 178 between the wall element 150 and guide flange 164, and an upper portion 180 between the guide flange 164 and top wall 172. The upper portion 180 provides an area through which the guide flange 164 may travel outward away from the wall element 150. Since the guide flange 164 is secured to the main body 156, this travel will also result in the main body 156 moving away from the wall element 150. This travel is designed to be sufficient open the wall port 152 for fluid to flow from the wall port 152. This fluid may be the combustion gas from the combustion chamber 28, or the plunger fluid 104, depending upon the placement of the wall port 152. As such, movement of the slide plug 154 unblocks the wall port 152, and may be used to either reduce the throttling or the piston back pressure, to thus selectively alter the performance of the inflator.

While this description shows how the slide plug 154 can move, there must of course be some element which actually causes the movement. Such an element could take various forms, such as mechanical (e.g., a pneumatic cylinder connected to the guide flange 164 and wall element 150 or top wall 172), electromechanical (e.g., a solenoid connected to the guide flange 164 and wall element 150 or top wall 172), or pyrotechnic. The preferred element is pyrotechnic.

Specifically, the partial side wall 168 may mount a slide plug initiator 182, having a form similar to the initiators described above. The slide plug initiator 182 may be received within an appropriate holder 184, and the holder received through the partial side wall 168, such that one end of the slide plug initiator 182 is outside of the cup interior 176 and accessible for electrical connection to the controller (not shown), and the other, pyrotechnic, end is received in the lower portion 178 of the cup interior 176. As may be envisioned, activation of the slide plug initiator 182 will cause an increase in pressure within the lower portion 178 of the cup interior 176, forcing the guide flange 164, and thus the main body 156, away from the wall element 150 to open the wall port 152. The mouth 174 must be in sufficient proximity to the main body 156 to permit the necessary pressure increase within the cup interior 176. The close sliding fit of the guide flange 164 within the partial side wall 168 assists in pressure generation, and further guides the main body 156 during its travel. Further, the shape of the guide flange 164 (forming the shoulder directed toward the main body 156) causes the guide flange 164 to be retained within the partial side wall 168 even after the wall port 152 has been opened, to ensure that the slide plug 154 remains associated with the inflator, and does not fly away and cause a danger to the vehicle occupant.

The amount of travel required to open the wall port 152 may be reduced by forming the plug head 162 with a taper or conical configuration, as shown. As may be envisioned, with such a shape the fluid may flow through the wall port 152 even though the radially inner end of the plug head 162 has not moved outside of the wall element 150. This allows the required amount of travel for the slide plug 154 to be reduced, thus reducing the size of the partial side wall 168.

As may be seen, the slide plug 154 may thus be selectively opened, if desired, to alter the performance of the inflator. In this regard, it is noted that one level of this performance will be achieved by not opening the wall port 152, or by opening the wall port 152 only after the inflator has been activated. In each of these situations the fluid within the combustion chamber 28 or plunger volume 94 will increase in pressure. This pressure will act against a film or foil 186 (corresponding e.g., to foil 122) initially. However, the pressure may be sufficient to rupture the foil 186 while it is still desired to maintain the wall port 152 closed. In this case, the fluid pressure will act against the plug head 162, and will tend to force the slide plug 154 to move outward.

To prevent unintentional movement of the slide plug 154, the partial side wall 168 may include one or more deformation locks 188. The deformation locks 188 are portions of the partial side wall 168 which have been plastically deformed inward at a position just above the guide flange 164, to thus block unintended movement of the slide plug 154 away from wall element 150. The deformation locks 188 are designed, however, to deform outward upon activation of the element for moving the slide plug 154, permitting the slide plug 154 to move when actually desired.

From this arrangement it may be seen that the various ports need not be initially open, and then selectively blocked by expansion of a cup. Rather, the various ports could alternatively be initially blocked, and later selectively opened, to provide the same adaptive performance as desired. It is also noted that the slide plug 154 and related structure could also be modified for operation similar to the first embodiments, i.e., to block an initially open port. For this arrangement the slide plug 154 would be held in an initially open position, such as by use of deformation locks 188 positioned between the guide flange 164 and wall element 150. The slide plug initiator 182 would be located in the upper portion 180, rather than the lower portion 178, to force the slide plug 154 inward upon activation. Depending upon the fit achieved between the plug head 162 and wall port 152, the deformation locks 188 (or another one of the deformation locks 188) would engage with the upper face of the guide flange 164 after inward travel to retain the slide plug 154 in its new position.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A method for providing adaptive performance in a regenerative monopropellant airbag inflator, said inflator including a housing having a longitudinal axis and defining an interior, said interior including at least one port extending through said housing, a piston within said interior, said piston dividing said interior into a fuel supply chamber and a combustion chamber, said port communicating with said combustion chamber, and said piston being mounted for movement along said longitudinal axis, a quantity of fluid monopropellant housed within said fuel supply chamber, a plurality of injection ports for flow of said fluid monopropellant from said fuel supply chamber to said combustion chamber upon said movement of said piston, and an initiator to initially cause said movement of said piston, said method comprising the steps of:

activating said initiator to begin said movement of said piston and begin combustion of said fluid monopropellant within said combustion chamber to produce an inflation gas which will exit said inflator via said ports; and prior to completion of said combustion of said fluid monopropellant, altering the performance of said inflator by selectively varying a force against said piston in a direction opposite to said movement, to thereby vary the speed of said movement of said piston, and thus vary the flow of said fluid monopropellant to said combustion chamber, to thereby vary the rate of production of said inflation gas.

2. The method of claim 1, wherein said step of altering the performance is performed substantially simultaneously with said step of activating said initiator.

3. The method of claim 1, wherein said step of altering the performance comprises varying a force against the piston, said step further including the steps of:

providing said piston with a plunger section mounted thereto for travel with said piston, and providing said housing with a plunger volume containing a plunger fluid, said plunger section being received within said plunger volume and reducing a free plunger volume during said movement of said piston, said plunger fluid creating a pressure against said plunger section to produce said force against said piston, and selectively varying said pressure of said plunger fluid.

4. The method of claim 3, wherein said step of selectively varying said pressure of said plunger fluid further includes:

providing a plunger generator in operative association with said free plunger volume to increase the pressure of said plunger fluid upon activation of said plunger generator, and selectively activating said plunger generator.

5. The method of claim 4, wherein said plunger volume is closed.

6. The method of claim 3, wherein said step of selectively varying said pressure of said plunger fluid further includes:

providing at least one plug vent communicating with said plunger volume for venting said plunger fluid from said plunger volume, and performing an action selected from the groups consisting of; I) selectively closing said plug vent to prevent said venting of said plunger fluid, and ii) selectively opening said plug vent to permit venting of said plunger fluid.

7. The method of claim 6, wherein said step of selectively varying said pressure includes selectively closing said plug vent, and wherein said step further includes:

providing an expansion cap in proximity to said plug vent, said expansion cap permitting said venting in a first, unexpanded state, and preventing said venting in a second expanded state, and selectively changing said expansion cap from said first state to said second state.

8. The method of claim 6, wherein said step of selectively varying said pressure includes selectively opening said plug vent, and wherein said step further includes:

providing a slide plug mounted to said housing for movement from a first position in which said slide plug prevents said venting, and a second position in which said slide plug permits said venting, and selectively moving said slide plug from said first position to said second position.

9. The method of claim 1, wherein said step of altering the performance comprises varying the size of the ports, said step further including the steps of:

defining said ports by providing said housing with at least one exit port and at least one throttling port;

and performing an action selected from the groups consisting of; I) selectively closing said throttling port to prevent said exit of said inflation gas through said throttling port, and ii) selectively opening said throttling port to permit said exit of said inflation gas through said throttling port.

10. The method of claim 9, wherein said step of selectively varying the size of said ports includes selectively closing said throttling port, and wherein said step further includes:

providing an expansion plug in proximity to said throttling port, said expansion plug permitting said exit of said inflation gas through said throttling port in a first, unexpanded state, and preventing said exit of said inflation gas through said throttling port in a second expanded state, and selectively changing said expansion plug from said first state to said second state.

11. The method of claim 9, wherein said step of selectively varying the size of said ports includes selectively opening said throttling port, and wherein said step farther includes:

providing a slide plug mounted to said housing for movement from a first position in which said slide plug prevents said exit of said inflation gas through said throttling port, and a second position in which said slide plug permits said exit of said inflation gas through said throttling port, and selectively moving said slide plug from said first position to said second position.

12. An adaptive regenerative inflator, comprising:

a housing having a longitudinal axis an defining an interior, said interior including at least one port extending through said housing, said housing further including a plunger volume;

a piston within said interior, said piston dividing said interior into a fuel supply chamber and a combustion chamber, said port communicating with said combustion chamber, and said piston being mounted for movement along said longitudinal axis;

a quantity of fluid monopropellant housed within said fuel supply chamber;

an initiator operatively associated with said combustion chamber;

a plurality of injection ports for flow of said fluid monopropellant from said fuel supply chamber to said combustion chamber;

a plunger section mounted to said piston for movement therewith, said plunger section being received within said plunger volume and reducing a free plunger volume during said movement of said piston;

a plunger fluid received in said plunger free volume for compression by said plunger section during said movement; and a plunger generator operatively associated with said plunger free volume such that selective activation of said plunger generator increases the pressure of said plunger fluid.

13. An inflator as in claim 12, wherein said plunger volume is closed.

14. An adaptive regenerative inflator, comprising:

a housing having a longitudinal axis defining an interior, said interior including at least one port extending through said housing, said housing further including a plunger volume;

a piston within said interior, said piston dividing said interior into a fuel supply chamber and a combustion chamber, said port communicating with said combustion chamber, and said piston being mounted for movement along said longitudinal axis;

a quantity of fluid monopropellant housed within said fuel supply chamber;

an initiator operatively associated with said combustion chamber;

a plurality of injection ports for flow of said fluid monopropellant from said fuel supply chamber to said combustion chamber;

a plunger section mounted to said piston for movement therewith, said plunger section being received within said plunger volume and reducing a free plunger volume during said movement of said piston;

a plunger fluid received in said plunger free volume for compression by said plunger section during said movement;

at least one plug vent permitting communication between said free plunger volume and atmosphere; and an expansion cap mounted to said housing in proximity to said plug vent, said expansion cap having a first, unexpanded state permitting communication of said plug vent with said free plunger volume, and a second, expanded state preventing communication of said plug vent with said free plunger volume.

15. An inflator as in claim 14, wherein said plunger volume is closed.

16. An inflator as in claim 14, further including a plunger vent communicating with said plunger volume.

17. An adaptive regenerative inflator, comprising:

a housing having a longitudinal axis defining an interior, said interior including at least one exit port and at least one throttling port, both extending through said housing, said housing further including a plunger volume;

a piston within said interior, said piston dividing said interior into a fuel supply chamber and a combustion chamber, said ports communicating with said combustion chamber, and said piston being mounted for movement along said longitudinal axis;

a quantity of fluid monopropellant housed within said fuel supply chamber;

an initiator operatively associated with said combustion chamber;

a plurality of injection ports for flow of said fluid monopropellant from said fuel supply chamber to said combustion chamber, where said fluid monopropellant produces an inflation gas;

an expansion plug mounted to said housing in proximity to said throttling port, said expansion plug having a first, unexpanded state permitting exit of said inflation gas through said throttling port, and a second, expanded state preventing exit of said inflation gas through said throttling port.

18. An inflator as in claim 17, further including a plug support mounting said expansion plug to said housing, said plug support including at least one void area through which said inflation gas may flow.

19. An inflator as in claim 17, wherein said expansion plug further includes a plug initiator received within an expansion cap, activation of said plug initiator changing said expansion plug from said first to said second state.

* * * * *